T. CARTER.
Seed-Planter.
No. 10,755.
Patented Apr. 11, 1854.
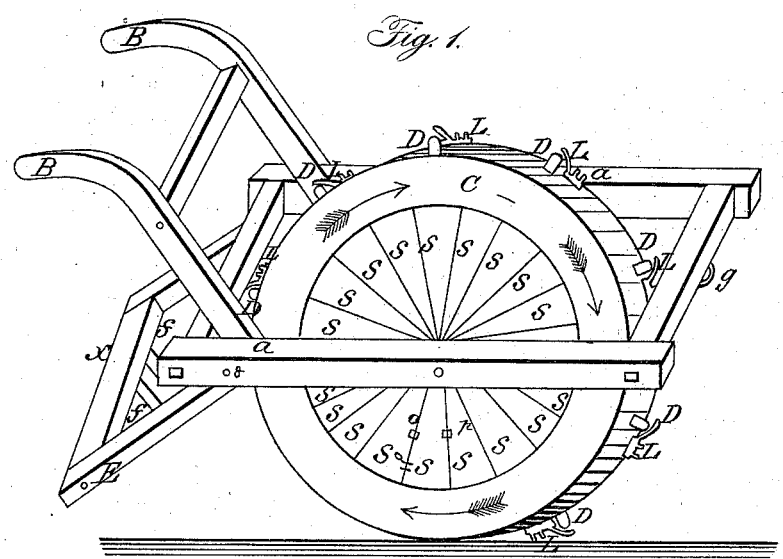
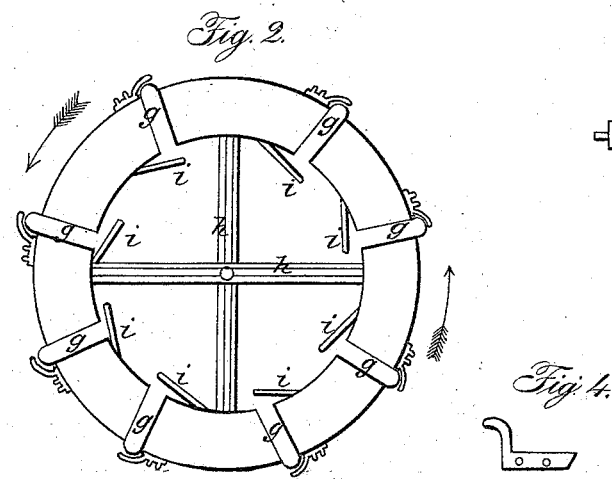
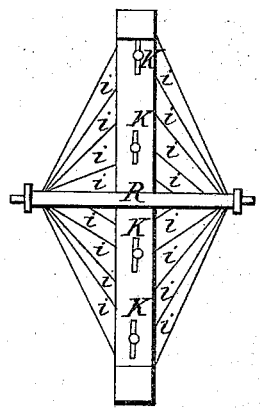

UNITED STATES PATENT OFFICE.

THOMAS CARTER, OF LAURENS DISTRICT, SOUTH CAROLINA.

IMPROVEMENT IN SEED-PLANTERS.

Specification forming part of Letters Patent No. 10,755, dated April 11, 1854.

*To all whom it may concern:*

Be it known that I, THOMAS CARTER, of Laurens District, and State of South Carolina, have invented a new and useful Improvement on a Cotton-Seed Planter; and I do hereby declare that the following is a full, clear, and exact description of the construction and operation of the same, reference being had to the annexed drawings, making a part of this specification, in which—

Figure 1 is a perspective view of the whole machine. Fig. 2 is a sectional view of the interior of the cylinder or seed-wheel. Fig. 3 is a sectional part of the cylinder; Fig. 4, a view of the spring-valve.

In Fig. 1, C represents the cylinder or seed-wheel, into which the seed are put through a door at the side. D represents the tubes through which the seed pass from the cylinder to the bed where they are planted. These are placed in the periphery of the cylinder, (at such distances apart as it is desired the seed should be dropped,) and are made of a piece of wood two inches by three, and two inches long, with an inch hole bored through it, and then let into the periphery of the seed-wheel in a mortise two by three, and made fast. $g$ in Fig. 1 represents the outer orifice, and K in Fig. 2 the inner orifice, of this tube.

$i\ i$ in Fig. 2 represent the small escapement iron spikes, placed over the inner orifice of this tube to regulate the quantity of seed desired to be let into the tubes at each revolution of the seed-wheel. These are made of strong wire about three inches long, and are fixed over the inner orifice, as represented in the model.

L in Fig. 1 represents the protecting spring-valves, which are placed at and over the outer orifice, and are for the double purpose, first, to prevent the dirt, as the seed-wheel revolves, from stopping up the orifice of the tube, and, second, to hold what seed the escapement-spikes at the inner orifice have suffered to enter until the hole in the ground or bed is made by the tube in which the seed are to be planted. The seed are put into the cylinder or seed-wheel, Fig. 1, at the side. One of the staves, $s$, Fig. 1, is fastened to the other staves by hinges $o\ o$, and fastened by a hook or button, $p$. This stave can then be opened and fastened at pleasure. These purposes are effected thus: As the seed-wheel revolves, its weight, with the seed in it, presses the tubes their whole length into the soft bed prepared for the seed. This pressure, while its weight is on a tube, shuts the valve of that tube, and as the seed-wheel rolls on and this tube leaves the hole it has made in the bed of earth the spring-valve opens and the seed then in the tube is deposited in the hole just made by the tube. This spring-valve should be made of steel, and is of the size and shape, and is attached to the orifice of the tube, as represented by the model.

The cylinder or seed-wheel, with the frame attached to it for the horse to pull it by, and the covering-scrapers to cover the seed, I am instructed have been invented and patented heretofore. I therefore disclaim any right to a patent therefor.

What I claim as my invention, and desire to secure by Letters Patent, is—

The seed-discharging apparatus in the periphery of the seed-wheel, the tube or apparatus $g$, the escapement-wires $i\ i$, &c., and the protecting spring-valves L, in the manner and for the purposes described.

THOMAS CARTER.

Witnesses:
C. B. GRIFFIN,
JAMES WILSON.